(12) United States Patent
Sakamoto

(10) Patent No.: US 8,731,394 B2
(45) Date of Patent: May 20, 2014

(54) LENS APPARATUS

(75) Inventor: Masayuki Sakamoto, Tokyo (JP)

(73) Assignee: Canon Kabushiki Kaisha (JP)

( * ) Notice: Subject to any disclaimer, the term of this patent is extended or adjusted under 35 U.S.C. 154(b) by 181 days.

(21) Appl. No.: 13/205,792

(22) Filed: Aug. 9, 2011

(65) Prior Publication Data

US 2012/0039591 A1 Feb. 16, 2012

(30) Foreign Application Priority Data

Aug. 12, 2010 (JP) ................................ 2010-180737
Jul. 27, 2011 (JP) ................................ 2011-163939

(51) Int. Cl.
*G03B 17/18* (2006.01)

(52) U.S. Cl.
USPC .......................................... 396/281; 396/287

(58) Field of Classification Search
USPC ..................................... 396/88, 281, 287, 509
See application file for complete search history.

(56) References Cited

U.S. PATENT DOCUMENTS

| 3,486,432 | A | * | 12/1969 | Norwood | 396/88 |
| 5,164,860 | A | * | 11/1992 | Suzuki et al. | 359/696 |
| 5,859,733 | A | * | 1/1999 | Miyano et al. | 359/824 |
| 6,148,151 | A | * | 11/2000 | Bauer | 396/56 |
| 6,724,429 | B2 | * | 4/2004 | Shore et al. | 348/373 |
| 7,003,223 | B2 | * | 2/2006 | Sasaki et al. | 396/103 |
| 7,808,547 | B2 | | 10/2010 | Hirai et al. | |
| 2004/0189848 | A1 | | 9/2004 | Idemura et al. | |
| 2012/0039591 | A1 | * | 2/2012 | Sakamoto | 396/133 |

FOREIGN PATENT DOCUMENTS

JP 2004294685 A 10/2004
JP 2005018035 A 1/2005

* cited by examiner

*Primary Examiner* — W B Perkey
(74) *Attorney, Agent, or Firm* — Rossi, Kimms & McDowell LLP

(57) ABSTRACT

Provided is a lens apparatus including: an optical member; and an operation member, which is connected to the optical member and is operated to drive the optical member, in which: the lens apparatus is capable of working in a checking mode for checking a specified set value of the lens apparatus; and in the checking mode, the operation member moves to a position corresponding to the specified set value so as to display the specified set value.

13 Claims, 5 Drawing Sheets

| STOP POSITION | FACTOR α |
|---|---|
| F16 | SET VALUE A |
| F8 | SET VALUE B |
| F4 | SET VALUE C |

| NO. | DISPLAY [FACTOR] | DISPLAY [SET VALUE] |
|---|---|---|
| 1 | FACTOR $\alpha$ | SET VALUE A ⇔ SET VALUE B ⇔ SET VALUE C |
| 2 | FACTOR $\beta$ | SET VALUE D ⇔ SET VALUE E ⇔ SET VALUE F |
| 3 | FACTOR $\gamma$ | SET VALUE G ⇔ SET VALUE H ⇔ SET VALUE I |
| 4 | SETTING OF SETTING/ CHECKING MODE | EFFECTIVE ⇔ INEFFECTIVE |

FIG. 7

| NO. | DISPLAY [ZOOM] | FACTOR | DISPLAY [FOCUS] | SET VALUE |
|---|---|---|---|---|
| 1 | 1 | FACTOR α | 1⇔2⇔3 | SET VALUE A ⇔ SET VALUE B ⇔ SET VALUE C |
| 2 | 2 | FACTOR β | 1⇔2⇔3 | SET VALUE D ⇔ SET VALUE E ⇔ SET VALUE F |
| 3 | 3 | FACTOR γ | 1⇔2⇔3 | SET VALUE G ⇔ SET VALUE H ⇔ SET VALUE I |
| 4 | 4 | SETTING OF SETTING/ CHECKING MODE | 1⇔2 | EFFECTIVE ⇔ INEFFECTIVE |

FIG. 8

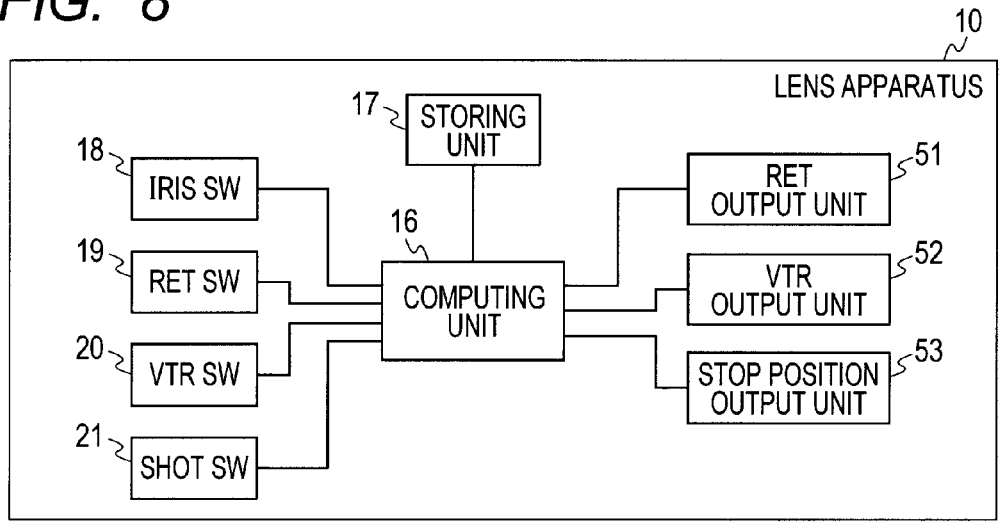

FIG. 9

| NO. | RET/ VTR | FACTOR | DISPLAY [STOP POSITION] | SET VALUE |
|---|---|---|---|---|
| 1 | LOW/ LOW | FACTOR α | 3V⇔4V⇔5V | SET VALUE A ⇔ SET VALUE B ⇔ SET VALUE C |
| 2 | LOW/ HIGH | FACTOR β | 3V⇔4V⇔5V | SET VALUE D ⇔ SET VALUE E ⇔ SET VALUE F |
| 3 | HIGH/ LOW | FACTOR γ | 3V⇔4V⇔5V | SET VALUE G ⇔ SET VALUE H ⇔ SET VALUE I |
| 4 | HIGH/ HIGH | SETTING OF SETTING/ CHECKING MODE | 3V⇔4V | EFFECTIVE ⇔ INEFFECTIVE |

LENS APPARATUS

BACKGROUND OF THE INVENTION

1. Field of the Invention

The present invention relates to a lens apparatus, and more particularly, to a lens apparatus in which a set value of each setting factor for the lens apparatus can be checked.

2. Description of the Related Art

Conventionally, there is known a method of providing a display unit in a lens system body for checking a set value of each lens system.

For instance, Japanese Patent Application Laid-Open No. 2004-294685 discloses a television lens provided with a display unit for displaying information. In addition, Japanese Patent Application Laid-Open No. 2005-018035 discloses a lens apparatus that automatically drives a zoom lens to a predetermined position when effective/ineffective of a function is switched.

The television lens disclosed in Japanese Patent Application Laid-Open No. 2004-294685 requires a special function to be provided for displaying the set value. If a special apparatus structure that is not used for a main operation of the lens apparatus is necessary for displaying and checking the set value in relatively low frequency, a lens system structure becomes complicated and a size thereof increases, which is not preferable. In addition, in the conventional method disclosed in Japanese Patent Application Laid-Open No. 2005-018035, because effective/ineffective of a function is switched by an operation, it cannot be checked whether or not the function is set to be effective at present.

SUMMARY OF THE INVENTION

In is therefore an object of the present invention to provide a lens apparatus in which a set value of each lens system can be checked and set using a function utilized for normal imaging operation in the lens system.

A lens apparatus includes; an optical member, and an operation member, which is connected to the optical member and is operated to drive the optical member, in which; the lens apparatus is capable of working in a checking mode for checking a specified set value of the lens apparatus, and in the checking mode, the operation member moves to a position corresponding to the specified set value so as to display the specified set value.

According to the present invention, it is possible to provide the lens apparatus in which the set value of each lens system can be checked using a function utilized for normal imaging operation in the lens system.

Further features of the present invention will become apparent from the following description of exemplary embodiments with reference to the attached drawings.

BRIEF DESCRIPTION OF THE DRAWINGS

FIG. 7 is a table of numeric values showing a relationship between respective setting factors and corresponding set values in the second embodiment.

FIG. 8 is a block diagram according to a third embodiment of the present invention.

FIG. 9 is a table of terminals showing a relationship between respective setting factors and corresponding set values in the third embodiment.

DESCRIPTION OF THE EMBODIMENTS

Figure 1:
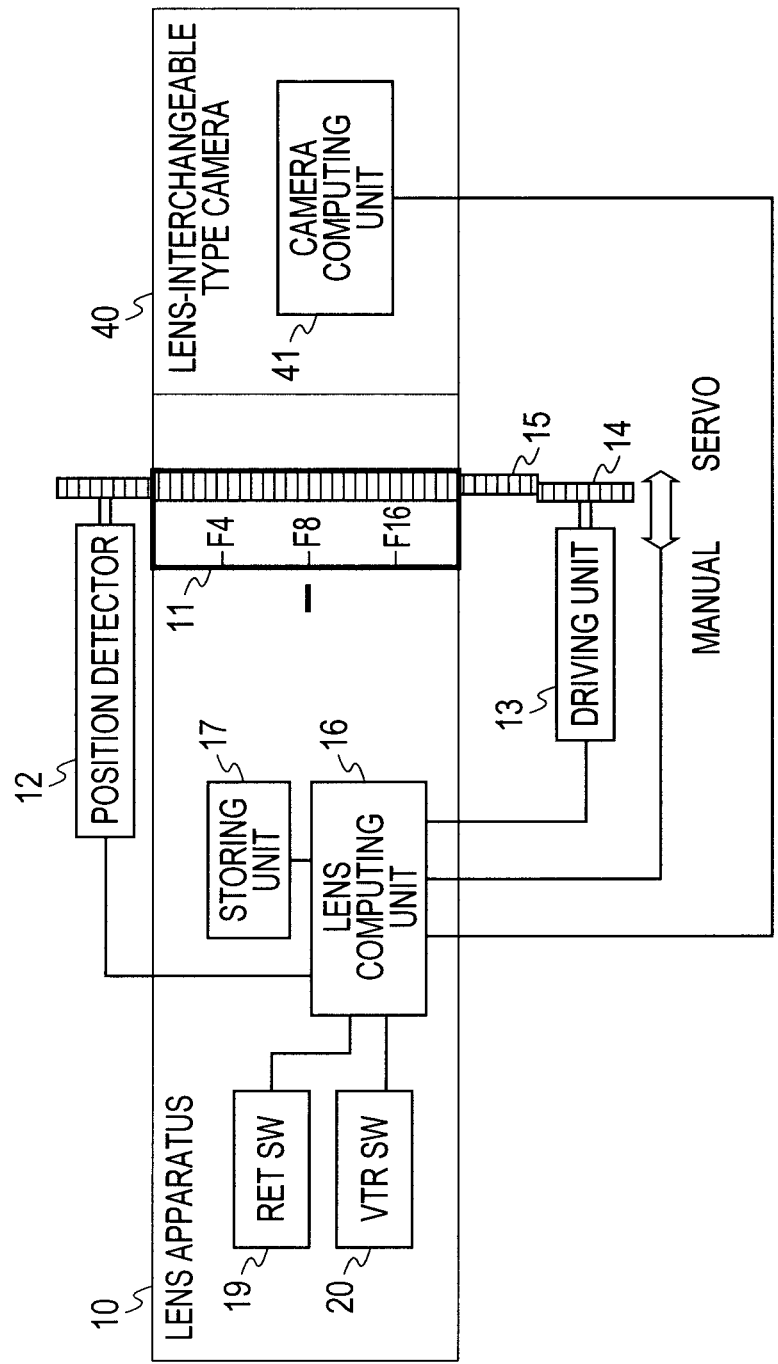
FIG. 1 is a block diagram according to a first embodiment of the present invention.

Hereinafter, exemplary embodiments of the present invention are described in detail with reference to the attached drawings. FIG. 1 is a block diagram illustrating a structure of a lens apparatus according to an embodiment of the present invention.

First Embodiment

Hereinafter, with reference to FIG. 1, a block diagram is described, which illustrates a structure of a lens apparatus according to a first embodiment of the present invention.

The lens apparatus of the present invention includes a lens system 10 and a lens-interchangeable type camera 40. The lens-interchangeable type camera 40 can be used for taking an image under a state in which the lens system 10 is connected to the lens-interchangeable type camera 40. The lens system 10 includes a stop 11. A light amount for taking an image with the lens-interchangeable type camera 40 can be adjusted by changing a position of the stop 11.

The lens system 10 includes a lens computing unit 16 for controlling the lens system 10.

The lens-interchangeable type camera 40 includes a camera computing unit 41 that can communicate with the lens computing unit 16. The camera computing unit 41 can send to the lens computing unit 16 a control request of the lens system 10 and a status obtaining request.

A position detector 12 detects the position of the stop 11. The position detector 12 is connected to the lens computing unit 16, and the lens computing unit 16 can obtain the position of the stop 11. Here, it is preferred that the stop 11 have a plurality of light blocking blades and work together with an aperture diameter changing mechanism of an aperture stop having variable aperture diameter (that the both are connected mechanically, or drive mechanisms thereof are connected via a gear or the like). In addition, it is preferred that the stop 11 work together with an iris ring too, which is operated when the stop is manually driven.

The position of the stop 11 can be changed by a driving unit 13 that is connected to the stop 11 via a gear 15. The driving unit 13 is connected to the lens computing unit 16, and the lens computing unit 16 can control driving of the driving unit 13. In a normal mode, the lens computing unit 16 changes the position of the stop 11 according to the control request from the lens-interchangeable type camera 40. Here, the normal mode refers to a mode in which an image can be taken in a normal manner.

A user can connect and disconnect the driving unit 13 and the gear 15 using a servo/manual switch 14. When the servo/manual switch 14 is in a servo state, the driving unit 13 and the gear 15 are connected to each other, and the lens computing unit 16 can drive and control the driving unit 13 so as to change the position of the stop 11. When the servo/manual switch 14 is in a manual state, the driving unit 13 and the gear 15 are disconnected so that the user can manually operate the stop 11.

A storing unit 17 that is connected to the lens computing unit 16 stores set values of the lens system 10.

The lens system 10 includes an RET switch (SW) 19 and a VTR switch (SW) 20 that are switches (command input units) connected to the lens computing unit 16. The lens computing unit 16 can check ON/OFF states of the switches. In the normal mode, the lens computing unit 16 sends back the ON/OFF states of the switches in response to the status obtaining request from the camera computing unit 41. In the description of the present invention, there are exemplified the VTR SW 20 for instructing start and end of shooting and the RET SW 19 for switching display of a screen during on-air and a screen showing moving image shot by another camera to a view finder, which are relatively generally provided in a broadcast lens apparatus. However, the present invention is basically not related to a main purpose given to the switch, and it is sufficient if there is an input function such as a switch function.

Note that, the state where the lens system is in the "normal mode" in the present invention refers to a state in which the lens system can perform a normal imaging function. In addition, a setting/checking mode refers to a mode to which the normal mode is changed by a specific operation. In the setting/checking mode, the lens system does not perform a normal imaging function, and setting and checking operation of a set value of the setting factor of the lens system can be performed. In addition, this setting/checking mode includes a checking mode for checking the above-mentioned set value of the setting factor and a setting mode for changing (resetting) the set value of the setting factor. It is possible to perform only one of the two modes. The same is true in the following embodiments.

Figures 2, 3:
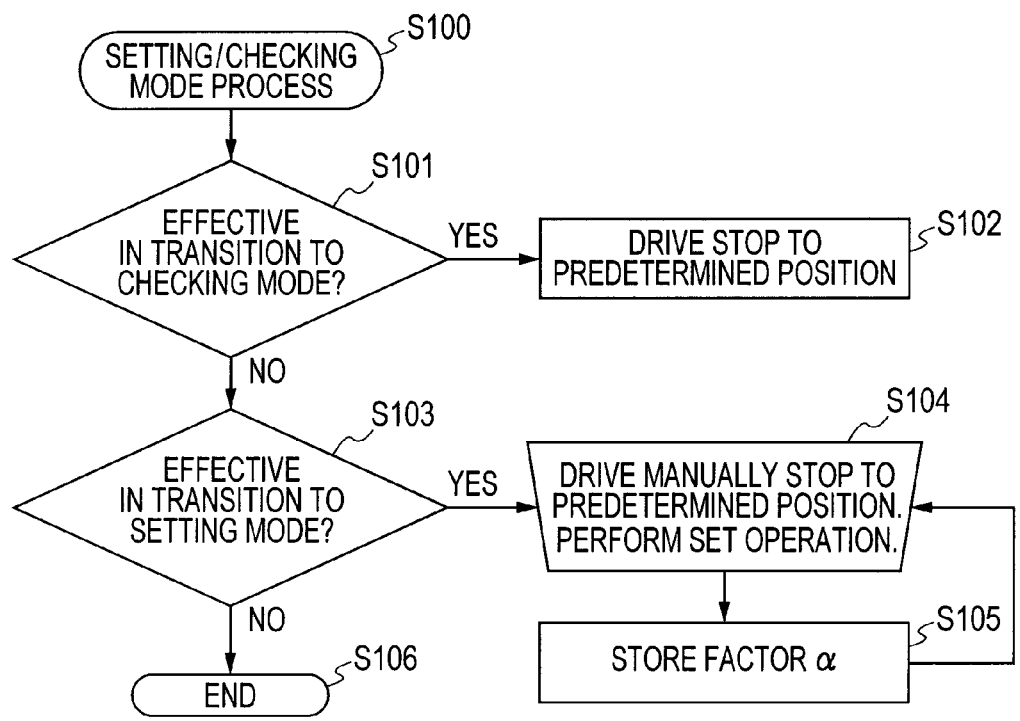
FIG. 2 is a table showing a relationship between set values of a setting factor α and stop positions in the first embodiment.
FIG. 3 is a flowchart according to the first embodiment.

A table shown in FIG. 2 represents a relationship between stop positions and set values of a setting factor α that is stored in the storing unit 17 and is used in the setting/checking mode. In the setting/checking mode process described below, the set value of the setting factor α can be checked by driving and controlling the position of the stop 11 according to this table. For instance, when the position of the stop 11 is F8, the set value of the setting factor α can be recognized as a set value B.

Hereinafter, with reference to FIG. 3, a flowchart illustrating the setting/checking mode process of the setting/checking mode according to the first embodiment of the present invention is described.

This process is performed according to a computer program stored in the lens computing unit 16. In Step S100, the setting/checking mode process of the lens computing unit 16 is started. Note that, this setting/checking mode process starts when the power is turned ON.

In Step S101, it is checked whether or not a transition to the checking mode is effective. Although not limited, it is determined that the transition to the checking mode is effective (selected) when the servo/manual switch 14 is in the servo state and the RET SW 19 is pressed, for example. When the transition to the checking mode is effective, the process proceeds to Step S102, and otherwise the process proceeds to Step S103.

In Step S102, according to the table shown in FIG. 2, the stop 11 is driven to a predetermined position of the stop 11 corresponding to a set value of the setting factor α stored in the storing unit 17. With this operation, it is possible to check the current set value of the setting factor α by viewing the stop 11. In other words, the stop in this case works no longer as a stop of the lens apparatus but works as a display that indirectly express the set value of the setting factor α as the stop position (the checking mode).

In Step S103, it is checked whether or not a transition to the setting mode is effective. Although not limited, it is determined that the transition to the setting mode is effective (selected) when the servo/manual switch 14 is in the manual state and the RET SW 19 is pressed, for example. When the transition to the setting mode is effective, the process proceeds to Step S104, and otherwise the process proceeds to Step S106.

In Step S104, according to the table shown in FIG. 2, the stop 11 is manually moved to a predetermined position so as to select a set value of the setting factor α, and a setting operation of setting the set value is performed. Then, the process proceeds to Step S105. The setting operation is not limited in particular, but it is determined that the setting operation is performed when the RET SW 19 and the VTR SW 20 are simultaneously pressed, for example.

In Step S105, according to the table shown in FIG. 2, the set value corresponding to the position of the stop 11 is stored in the storing unit 17 as a set value of the setting factor α, and the process proceeds to Step S104. With this operation, the set value of the setting factor α can be set to a desired value (setting mode).

In Step S106, the setting/checking mode process is finished, and the mode is changed to the normal mode.

With this control, in the normal mode, the stop 11 is driven in response to the control request from the lens-interchangeable type camera 40. In addition, in the setting/checking mode for performing the setting/checking mode process, the stop 11 is driven according to the set value of the setting factor α stored in the storing unit 17, and operations of the servo/manual switch 14 and the RET SW 19.

Note that, in this embodiment, the setting/checking mode process is started when the power is turned ON but it is possible to provide another switch for entering the setting/checking mode and to start the setting/checking mode process when the switch is turned ON.

In addition, in this embodiment, the stop 11 is used as a device to be controlled, which is controlled by the lens computing unit 16, so that the set value of the setting factor can be checked. However, a zooming portion for adjusting a focal length (not shown) or a focusing portion for adjusting a focus state may be used as the device to be controlled.

In this way, the lens apparatus of this embodiment includes an optical member such as the stop, and an operation member, which is connected to the optical member and is operated to drive the optical member. Here, this lens apparatus can work in the checking mode for checking a specified set value of the lens apparatus. In the embodiment described above, the operation member (iris ring), which is used for operating a variable stop or checking a value of the stop (F number) in the normal mode (such as a normal shooting mode), represents another setting factor in the checking mode. Here, the operation member moves to a position corresponding to the specified set value so as to display the specified set value (a value set for the specified factor), which is different from the function performed by the operation member in the normal mode.

In addition, in the first embodiment, the operation member for operating the variable stop is used for displaying a set value for the specified factor, but the present invention is not limited thereto. For instance, a zoom ring that is operated for driving the zooming portion that moves for magnification-varying as described above, or a focus ring that is operated for focus adjustment (focusing action) may be used as the operation member, and by using the operation member, a set value (detected value) instead of a zoom position or a focus position may be displayed.

According to the present invention described above, it is possible to provide a lens apparatus in which a set value of each lens system can be checked and set using a member that has a function necessary for normal imaging in the lens system (so that the member performs another function).

Second Embodiment

Hereinafter, with reference to FIG. 4, a block diagram is described, which illustrates a structure of a lens apparatus according to a second embodiment of the present invention. Points that are same to those of the first embodiment are not particularly described in detail here.

The lens apparatus of this embodiment includes a lens system 10 and a lens-interchangeable type camera 40. The lens-interchangeable type camera 40 can be used for taking an image under a state in which the lens system 10 is connected to the lens-interchangeable type camera 40.

The lens system 10 includes a lens computing unit 16 for controlling the lens system 10.

The lens-interchangeable type camera 40 includes a camera computing unit 41 that can communicate with the lens computing unit 16 via serial communication, for example. This communication can be freely stopped from the camera computing unit 41 or the lens computing unit 16. The camera computing unit 41 can perform an obtaining request of a state of the lens system 10 and a predetermined character string (for example, a name of the lens system 10) with respect to the lens computing unit 16.

The lens-interchangeable type camera 40 includes a display 42 connected to the camera computing unit 41. In the normal mode, the camera computing unit 41 displays the predetermined character string (for example, a name of the lens system 10 or the like) obtained from the lens system 10 on the display 42.

The lens system 10 includes a storing unit 17 connected to the lens computing unit 16. The storing unit 17 stores a set value of the lens system 10.

The lens system 10 includes an RET SW 19 and a VTR SW 20 that are switches connected to the lens computing unit 16 as the command input units, and the lens computing unit 16 can check ON/OFF states of the switches. In the normal mode, the lens computing unit 16 sends back the ON/OFF states of the switches in response to the status obtaining request from the camera computing unit 41.

Further, the lens system 10 includes an IRIS SW 18 that is a switch connected to the lens computing unit 16 as one of the command input units, and the lens computing unit 16 can check an ON/OFF state of the switch. In the normal mode, a stop (not shown) connected to the lens computing unit 16 is driven in a servo mode in the ON state of the IRIS SW 18 and can be manually operated in the OFF state.

Further, the lens system 10 includes a Shot SW 21 that is a switch connected to the lens computing unit 16 as one of the command input units, and the lens computing unit 16 can check an ON/OFF state of the switch. In the normal mode, a zoom portion (not shown) connected to the lens computing unit 16 is driven and controlled to move to a specified zoom position when the Shot SW 21 is turned ON.

Figures 4, 5:
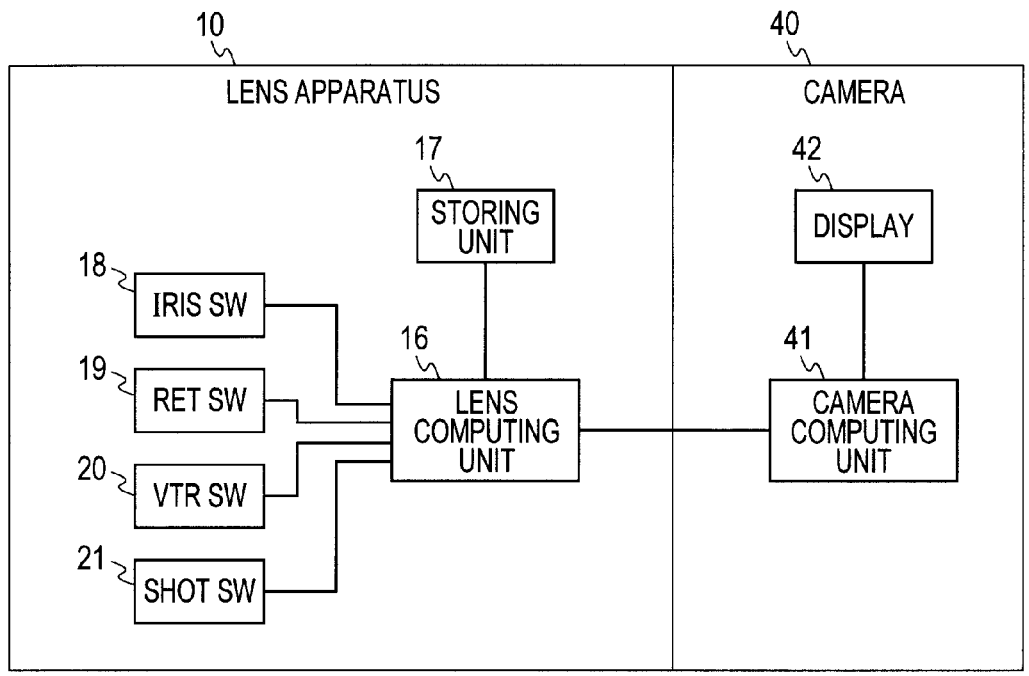
FIG. 4 is a block diagram according to a second embodiment of the present invention.
FIG. 5 is a table of character strings showing a relationship between respective setting factors and corresponding set values in the second embodiment.

A table shown in FIG. 5 represents a relationship between set values of respective setting factors that are stored in the storing unit 17 and are used in the setting/checking mode. For instance, the setting factor α can take one of three set values A, B and C, and one of the set values is stored.

In the setting/checking mode process described below, the setting/checking mode character string is sent back in response to an obtaining request of the predetermined character string from the camera computing unit 41. The setting/checking mode character string refers to a character string generated with a specified number as an object to be displayed among numbers in a table shown in FIG. 5. For instance, when No. 1 is currently selected to specify the setting factor α, and the set value of the setting factor α is the set value A, the setting/checking mode character string is generated as "setting factor α: set value A". For instance, as specific examples of the setting factor, there are the stop, the zoom, and the focus, while the set values respectively corresponding to the setting factors are the stop value, the zoom position, and the focus position.

The setting/checking mode character string is displayed as the predetermined character string on the display 42, and therefore the set value of each setting factor can be checked.

Hereinafter, with reference to FIG. 6, a flowchart illustrating the setting/checking mode process of the setting/checking mode according to the second embodiment of the present invention is described.

This process is performed according to a computer program stored in the lens computing unit 16. In Step S200, the setting/checking mode process of the lens computing unit 16 is started. Note that, this setting/checking mode process starts when the power is turned ON. Further, at this time, the setting of the setting/checking mode is set to be effective.

In Step S201, communication with the camera is once stopped and then is started again, and then the process proceeds to Step S202.

In Step S202, it is checked whether or not the setting of the setting/checking mode is effective. If the setting of the setting/checking mode is effective, the process proceeds to Step S203, and otherwise the process proceeds to Step S211.

In Step S203, it is checked whether or not the IRIS SW 18 is ON. If the IRIS SW 18 is ON, the process proceeds to Step S204, and otherwise the process proceeds to Step S205. In Step S204, the lens computing unit 16 increments a setting factor number shown in the table of FIG. 5. For instance, when No. 2 is currently selected to specify the setting factor β, the selected No. 2 is switched to No. 3 to specify a setting factor γ and the setting factor displayed by the setting/checking mode character string becomes the setting factor γ. After that, the process proceeds to Step S201.

In Step S205, it is checked whether or not the RET SW 19 is ON. If the RET SW 18 is ON, the process flow proceeds Step S206, and otherwise the process proceeds to Step S207.

In Step S206, the lens computing unit 16 decrements a setting factor number shown in the table of FIG. 5. For instance, when No. 2 is currently selected to specify the setting factor β, the selected No. 2 is switched to No. 1 so that the setting factor α is specified, and the setting factor displayed by the setting/checking mode character string becomes the setting factor α. After that, the process proceeds to Step S201.

In Step S207, it is checked whether or not the Shot SW 21 is ON. If the Shot SW 21 is ON, the process proceeds to Step S208, and otherwise the process proceeds to Step S209.

In Step S208, the lens computing unit 16 increments a set value set for the setting factor corresponding to the setting factor number that is currently selected. For instance, when No. 1 is selected to specify the setting factor α, and the current set value is the set value B, the set value is incremented and set to the set value C (see FIG. 5). After that, the process proceeds to Step S201.

In Step S209, it is checked whether or not the VTR SW 20 is ON. If the VTR SW 20 is ON, the process flow proceeds to Step S210, and otherwise the process proceeds to Step S203.

In Step S210, the lens computing unit 16 decrements a set value set for the setting factor corresponding to the setting factor number that is currently selected. For instance, when No. 1 is currently selected to specify the setting factor α, and the current set value is the set value B, the set value is decremented and set to the set value A (see FIG. 5). After that, the process proceeds to Step S201.

In Step S211, the setting/checking mode process is finished, and the mode is changed to the normal mode.

Note that, it is assumed that the camera computing unit 41 of the lens-interchangeable type camera obtains the character string to be displayed on the display 42 such as a name of the connected lens apparatus only once when the communication with the lens system 10 is started in the normal mode. In this embodiment, this function is utilized for checking the set values of the lens apparatus. Therefore, in order to update the character string to be displayed on the display 42, communication with the camera is once stopped and is then started again in Step S201. By performing Step S201, the camera computing unit 41 performs the obtaining request of the character string to be displayed on the display 42 with respect to the lens system 10. In response to this request, the lens computing unit 16 of the lens system 10 generates the setting/checking mode character string including the setting factor corresponding to the setting factor number selected in Step S204, S206, S208 or S210 and the set value set for the setting factor so as to send the setting/checking mode character string back to the camera computing unit 41. Then, the character string is displayed on the display 42.

In addition, No. 4 shown in the table of FIG. 5 represents the setting factor that is set when the setting/checking mode process is caused to be finished. When the setting of setting/checking mode is set to be ineffective, the process proceeds from Step S202 to Step S211, and the setting/checking mode process is finished.

With this control, in the normal mode, the display 42 displays the predetermined character string (for example, a name of the lens system 10). In the setting/checking mode in which the setting/checking mode process is performed, the setting/checking mode character string generated from the setting factor and the set value stored in the storing unit 17 is displayed on the display 42, according to operations of the IRIS SW 18, the RET SW 19, the VTR SW 20, and the Shot SW 21.

In this embodiment, in order that a set value of the setting factor can be checked, a communication unit (not shown) of the lens computing unit 16 is used as the device to be controlled, which is controlled by the lens computing unit 16. The function of displaying the predetermined character string on the display 42 is used, but it is possible to use a function of displaying a lens position on the display 42 as shown in the table of FIG. 7. Here, a function of displaying positions of a zoom portion and a focus portion (not shown) by numeric values is used. In this case, in the setting/checking mode, when "1" is displayed at the zoom portion and "1" is displayed at the focus portion, it is represented that No. 1 is currently selected to specify the setting factor α, and the set value is the set value A. In addition, in this case, it can be considered that the camera computing unit 41 obtains lens position information as needed for updating the display. Therefore, it is not necessary to perform the action of once stopping the communication with the camera in the Step S201.

According to the present invention, it is possible to provide a lens apparatus in which a set value of each lens system can be checked and set using a function utilized for normal imaging operation in the lens system.

Third Embodiment

Hereinafter, with reference to FIG. 8, a block diagram is described, which illustrates a structure of a lens apparatus according to a third embodiment of the present invention. Points that are same to those of the first embodiment are not particularly described in detail here.

The lens apparatus of this embodiment includes a lens system 10 and a lens-interchangeable type camera (not shown). The lens-interchangeable type camera can be used for taking an image under a state in which the lens system 10 is connected to the lens-interchangeable type camera.

The lens system 10 includes a lens computing unit 16 for controlling the lens system 10.

In addition, the lens system 10 includes a storing unit 17 connected to the lens computing unit 16, and the storing unit 17 stores set values of the lens system 10.

The lens system 10 includes an RET SW 19, a VTR SW 20, an IRIS SW 18, and a Shot SW 21, that are switches connected to the lens computing unit 16. Those switches operate similarly to the switches described in the second embodiment. In other words, as to designation of the setting factor, the setting factor number is incremented by the IRIS SW 18 and is decremented by the RET SW 19. A set value for the designated setting factor is incremented by the Shot SW 21 and is decremented by the VTR SW 20.

The lens system 10 further includes an RET output unit 51 and a VTR output unit 52 that are terminals connected to the lens computing unit 16. In the normal mode, interlocking with ON/OFF states of respective switches of the RET SW 19 and the VTR SW 20, high/low states of output voltages of terminals of the RET output unit 51 and the VTR output unit 52 changes. By the output voltages of the terminals of the RET output unit 51 and the VTR output unit 52, the lens-interchangeable type camera (not shown) can check each switch state of the lens system.

The lens system 10 further includes a stop position output unit 53 that is a terminal connected to the lens computing unit 16. In the normal mode, the stop position output unit 53 interlocks with a position of a stop (not shown) so that the voltage changes. For instance, when the stop position is F2.8, the voltage is 6.2 volts. When the stop position is F16, the voltage is 3.4 volts. With this terminal, the lens-interchangeable type camera (not shown) can check the position of the stop of the lens system.

A table shown in FIG. 9 represents a relationship between the respective setting factors and corresponding set values stored in the storing unit 17, which are used in the setting/checking mode. For instance, set values A, B and C can be set for the setting factor α, and one of the set values is stored.

Here, the setting factor number is expressed by a combination of output voltages of the RET output unit 51 and the VTR output unit 52, and a set value set for the setting factor corresponding to the setting factor number is expressed by the stop position output unit 53. For instance, when the RET output unit 51 is low, the VTR output unit 52 is low, and the stop position output unit 53 is 3 volts, then "1" is selected as the current setting factor number, the corresponding setting factor is the "setting factor α", and the set value set for the setting factor α is the set value A.

In the second embodiment, when communication between the lens system 10 and the lens-interchangeable type camera 40 is established, the lens-interchangeable type camera 40 uses the function of receiving the character string for identifying the connected lens system 10 from the lens system 10 as initial information and displaying the information on the display 42, so as to display the set value set for setting factors of the lens system 10. In this embodiment, in order that a set value of the setting factor can be checked, the RET output unit 51, the VTR output unit 52, and the stop position output unit 53 are used as devices to be controlled, which are controlled by the lens computing unit 16. In other words, in the third embodiment, information expressing the setting factor by a combination of high or low voltages of the RET output unit 51 and the VTR output unit 52 is output as information to be output from the lens system 10 to the lens-interchangeable type camera 40, and information expressing a set value corresponding to the setting factor is output by the voltage of the stop position output unit 53.

Figure 6:
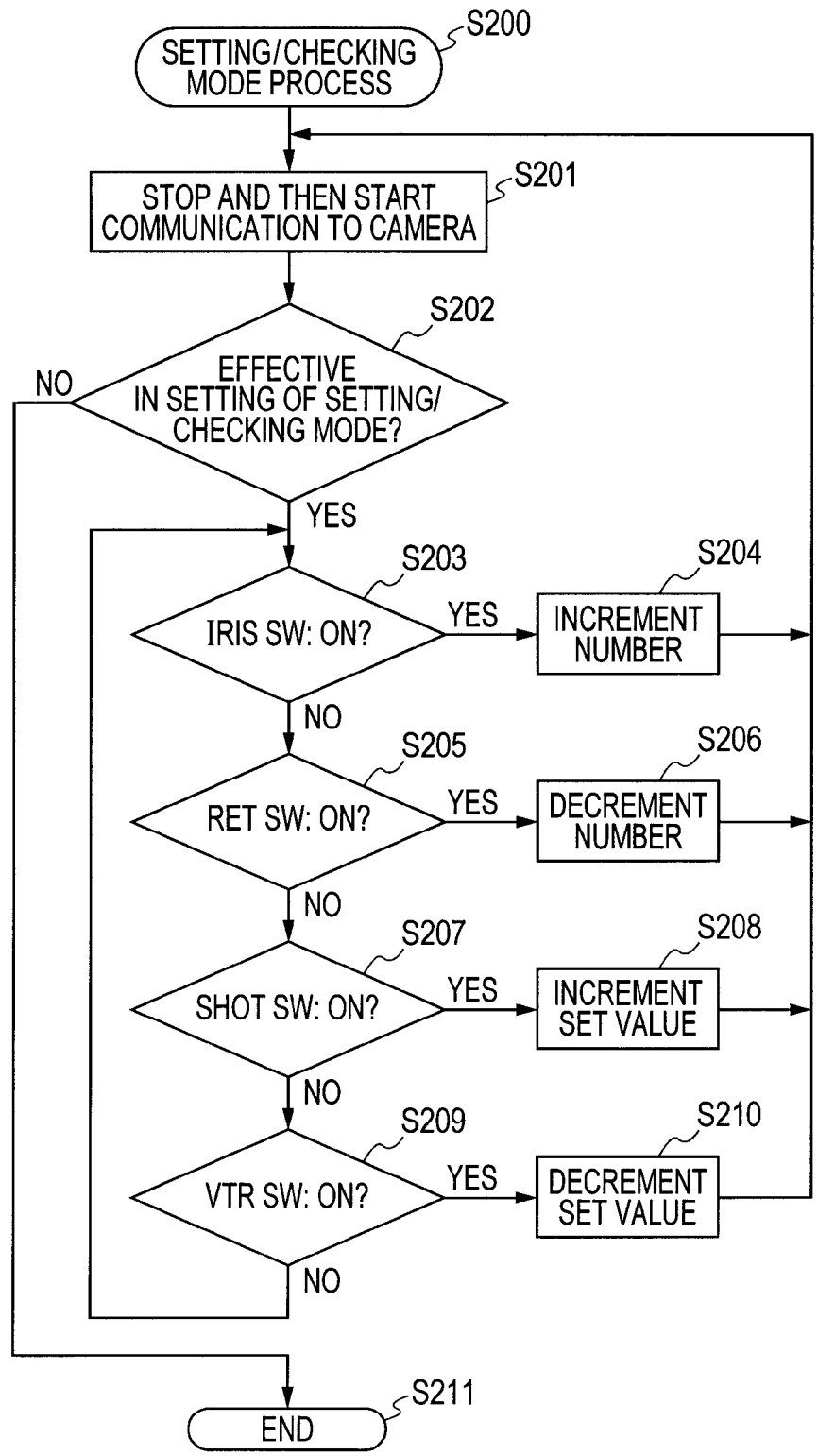
FIG. 6 is a flowchart according to the second embodiment.

Therefore, the flowchart illustrating the setting/checking mode process in the setting/checking mode according to the third embodiment of the present invention is the same as that according to the second embodiment of the present invention illustrated in FIG. 6. In this case, it is not necessary to perform the action of once stopping the communication with the camera in the Step S201.

With this control, in the normal mode, the state of the normal imaging function is reflected on the output terminals of the RET output unit 51, the VTR output unit 52, and the stop position output unit 53. In addition, in the setting/checking mode in which the setting/checking mode process is performed, according to operations of the IRIS SW 18, the RET SW 19, the VTR SW 20, and the Shot SW 21, the respective terminals become the state on which the setting factor and the set value stored in the storing unit 17 are reflected.

According to the present invention, it is possible to provide a lens apparatus in which a set value of each lens system can be checked and set using a function utilized for normal imaging operation in the lens system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-180737, filed Aug. 12, 2010, and 2011-163939, filed Jul. 27, 2011, which are hereby incorporated by reference herein in their entirety.

What is claimed is:

1. A lens apparatus comprising:
an optical member drivable to a plurality of positions;
an operation member configured to drive the optical member to one of the plurality of positions of the optical member and having an indication associated with the one position;
a controller configured to control the lens apparatus in a normal mode and a checking mode,
wherein the controller:
controls, in the normal mode, driving of the optical member to the one position of the optical member according to an operation amount of the operation member; and
controls, in the checking mode, driving of the operation member to the one position of the optical member to display the indication corresponding to the one position, the indication corresponding to the one position in the checking mode being different from the indication corresponding to the one position in the normal mode; and
a memory device storing a set value of the indication associated with the one position of the optical member in the checking mode in relation to a set value of the indication associated with the one position of the optical member in the normal mode.

2. A lens apparatus according to claim 1, further comprising:
a switch,
wherein the controller further has a setting mode,
wherein the controller controls the lens apparatus in different manners among the normal mode, the checking mode, and the setting mode, and
wherein upon the switch being operated in the setting mode, the controller stores in the memory device a set value other than the set value of the optical member corresponding to the operation member in relation to an indication corresponding to a position of the operation member at a time point when the switch is operated.

3. A lens apparatus according to claim 1, wherein the optical member and the operation member work together.

4. A lens apparatus according to claim 1, wherein the operation member is a ring-like member disposed at a periphery of the lens apparatus.

5. A lens apparatus according to claim 1, wherein:
the optical member comprises a magnification-varying lens unit of the lens apparatus, the magnification-varying lens unit moving to vary magnification; and
the operation member comprises a zoom ring, which is operated to drive the magnification-varying lens unit.

6. A lens apparatus according to claim 1, wherein:
the optical member comprises a focus lens unit of the lens apparatus, the focus lens unit moving for focusing; and
the operation member comprises a focus ring, which is operated to drive the focus lens unit.

7. A lens apparatus according to claim 1, wherein:
the optical member comprises a stop member having a variable aperture diameter; and
the operation member comprises an iris ring, which is operated to drive the stop member.

8. A lens apparatus comprising:
a control unit for controlling the lens apparatus;
a command input unit for inputting a command to the control unit;
a communication unit connected to the control unit, the communication unit communicating with a camera that is attachable to the lens apparatus; and
a storage unit for storing a set value of a setting factor of the lens apparatus,
wherein the control unit has:
a normal mode for controlling the communication unit according to the command from the command input unit; and
a setting/checking mode for controlling, according to the command from the command input unit, the communication unit to perform output based on the set value of the setting factor stored in the storage unit, and for changing the set value according to the command from the command input unit.

9. A lens apparatus according to claim 8, wherein the communication unit is a serial communication unit for cutting/connecting a communication of the serial communication unit under the setting/checking mode.

10. A lens apparatus according to claim 8, wherein the camera apparatus comprises a display unit, the display unit displaying an information obtained from the lens apparatus using the communication unit.

11. A lens apparatus according to claim 8, wherein the control unit selects a setting factor stored in the storage unit according to an operation of the command input unit, and controls the communication unit on basis of a set value of the selected setting factor, or changing the selected setting factor according to an operation of the command input unit.

12. An image pickup apparatus comprising:
an image pickup element; and
a lens apparatus for leading light from a subject to the image pickup element,
wherein the lens apparatus comprises:
an optical member drivable to a plurality of positions;
an operation member configured to drive the optical member to one of the plurality of positions of the optical member and having an indication associated with the one position;
a controller configured to control the lens apparatus in a normal mode and a checking mode,
wherein the controller:
controls, in the normal mode, driving of the optical member to the one position of the optical member according to an operation amount of the operation member; and
controls, in the checking mode, driving of the operation member to the one position of the optical member to display the indication corresponding to the one position, the indication corresponding to the one position in the checking mode being different from the indication corresponding to the one position in the normal mode; and a memory device storing a set value of the indication associated with the one position of the optical member in the checking mode in relation to a set value of the indication associated with the one position of the optical member in the normal mode.

13. An image pickup apparatus comprising:
an image pickup element; and
a lens apparatus for leading light from a subject to the image pickup element,
wherein the lens apparatus comprising:
a control unit for controlling the lens apparatus;
a command input unit for inputting a command to the control unit;
a communication unit connected to the control unit, the communication unit communicating with a camera attachable to the lens apparatus; and
a storage unit for storing a set value of a setting factor of the lens apparatus,
wherein the control unit has:
a normal mode for controlling the communication unit according to the command from the command input unit; and
a setting/checking mode for controlling, according to the command from the command input unit, the communication unit to perform output based on the set value of the setting factor stored in the storage unit, and for changing the set value according to the command from the command input unit.

* * * * *